G. A. BADER.
LENS MOUNTING.
APPLICATION FILED DEC. 18, 1915.
1,193,341.
Patented Aug. 1, 1916.
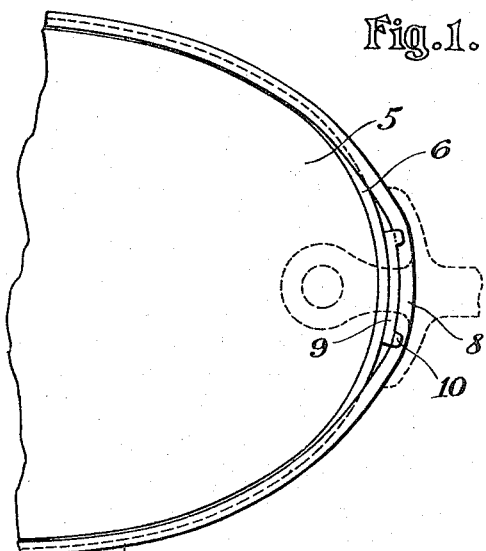
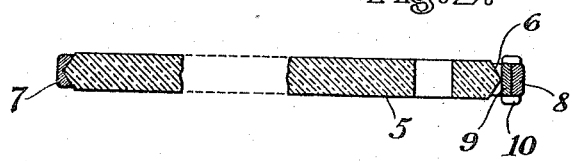
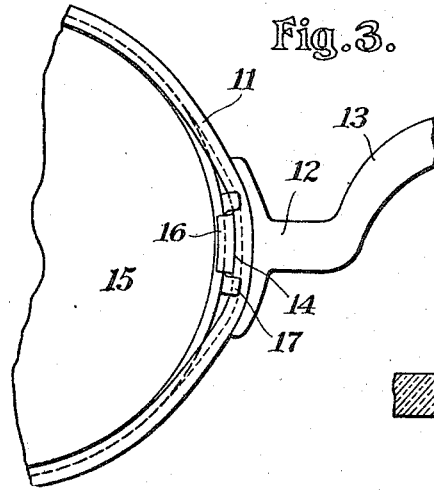
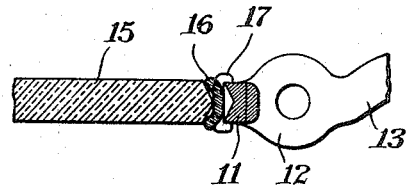
Inventor:
Gustav A. Bader
by his attorneys
Davis & Dorsey

UNITED STATES PATENT OFFICE.

GUSTAV A. BADER, OF ROCHESTER, NEW YORK.

LENS-MOUNTING.

1,193,341.  Specification of Letters Patent.  Patented Aug. 1, 1916.

Application filed December 18, 1915. Serial No. 67,587.

*To all whom it may concern:*

Be it known that I, GUSTAV A. BADER, a citizen of the United States, and resident of Rochester, in the county of Monroe and State of New York, have invented certain new and useful Improvements in Lens-Mountings, of which the following is a specification.

This invention relates to means for mounting a lens or glass, such as an eyeglass, in a rim of metal or other material. It is particularly useful in connection with spectacles and eyeglasses, but may be employed in connection with lenses or glasses of other kinds.

The object of the invention is to produce a lens-mounting in which the rim and the lens are secured together by a groove on the one member, and a corresponding ridge or convexity on the other, but in which the rim, instead of being divided in the usual manner to permit the introduction of the lens and the tightening of the rim upon the lens, is made continuous or undivided, so as to avoid the weakness and the expense and complication of the structure involved in the provision of a break or joint in the rim. This result is accomplished by using a rim which is a little larger than the periphery of the lens, so that it may be passed over the lens without difficulty. The lens is then moved, relatively to the rim, so that the groove and the convexity of the two parts are fitted together throughout the greater part of their extent, and the slack between the rim and the lens is then taken up by a filler, which is introduced preferably at one end of the lens, in the case of the oval lens of eyeglasses or spectacles. This filler is of such thickness as to fit closely between the lens and the rim, and the filler may be secured in place in various ways, either by lugs formed upon it and engaging the lens and the rim laterally, or by engagement with a lens-clip or other part of the lens-mounting.

In the accompanying drawings: Figure 1 is a front-elevation, on an enlarged scale, of a portion of an eyeglass-mounting embodying the present invention, and Fig. 2 is a horizontal section of the same; and Figs. 3 and 4 are, respectively, a front-elevation and a horizontal section, showing a modified form of the invention as applied to a spectacle or eyeglass frame of the rim type.

The invention is illustrated particularly as embodied in eyeglasses and spectacle mountings, and as shown in Figs. 1 and 2 it is adapted for use in a mounting of the rimless type, that is to say, one in which the bridge, in the case of an eyeglass-mounting, or the bridge and the temple in the case of a spectacle-mounting, are fastened directly to the lenses by means of screws passing through perforations. In mountings of this type a light rim or band of celluloid or wire is sometimes provided for the sole purpose of protecting the lens against injury, and without change in the general character of the mounting.

As shown in Figs. 1 and 2 the lens 5 has a beveled edge 6, and is provided with a slender rim 7, which is grooved on its inner surface to correspond with the beveled edge of the lens. The groove extends throughout the greater part of the rim, but is interrupted at one end, so as to leave a smooth inner surface on the rim. The rim is enough larger than the lens to permit the lens to be slipped into the rim without straining. The lens is then moved within the rim to the left, as shown in the figure, and the filler 9 is interposed between the right-hand ends of the lens and the rim. This filler is formed of sheet-metal of the proper thickness, and it is retained in place by lugs 10 which are bent up against the lateral surfaces of the rim. The lens is shown as perforated, to receive the usual screw for fastening it to the lens-clip which is shown in dotted lines in Fig. 1, and when this clip is in place the filler is for the most part concealed, so that the mounting has a neat and substantial appearance.

In Figs. 3 and 4 the rim is shown as employed in a mounting of the rim type. In this case the rim 11 is somewhat heavier than that of Figs. 1 and 2, and is soldered directly to the part 12 which forms the end of the bridge 13 of the mounting. In this case the filler 14 is shown as provided not only with lugs 17 for engaging the rim, but also with lugs 16 bent against the adjacent surfaces of the lens, so as to secure the lens firmly against lateral displacement at the end which is not seated in the groove of the rim. As above stated, the groove may be made to extend throughout the length of the rim, including that part which is engaged by the filler, as shown in Fig. 4.

While I have described the invention particularly as employed in connection with a grooved rim and a bevel-edged lens, it will be apparent that it is equally applicable to a rim of the well known type in which the edge of the lens is grooved and the rim, usually in the form of a wire of circular cross-section, is seated in the groove in the lens.

I claim:—

1. In a lens-mounting, the combination of a lens and a continuous rim therefor, one of these parts having a groove for the reception of the other, and the rim being large enough to slip over the lens; and a filler interposed between the rim and a portion of the periphery of the lens and adapted to take up slack between the rim and the lens and hold them in firm engagement.

2. In a lens-mounting, the combination of a lens and a continuous rim therefor, one of these parts having a groove for the reception of the other, and the rim being large enough to slip over the lens; and a filler interposed between the rim and a portion of the periphery of the lens and adapted to take up slack between the rim and the lens and hold them in firm engagement, said filler having lugs which engage one of the adjacent parts to prevent lateral displacement of the filler.

GUSTAV A. BADER.

Copies of this patent may be obtained for five cents each, by addressing the "Commissioner of Patents, Washington, D. C."